United States Patent
Kobayashi et al.

(10) Patent No.: US 9,803,315 B2
(45) Date of Patent: Oct. 31, 2017

(54) CATIONIZING AGENT, METHOD FOR FIRMLY FIXING WATER-INSOLUBLE PARTICLES, AND METHOD FOR PRODUCING DYED MATERIAL

(71) Applicant: Mitsubishi Chemical Corporation, Tokyo (JP)

(72) Inventors: Takayuki Kobayashi, Yokohama (JP); Hideaki Oonishi, Yokohama (JP); Akihiro Miyake, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 153 days.

(21) Appl. No.: 14/772,233

(22) PCT Filed: Mar. 18, 2014

(86) PCT No.: PCT/JP2014/057267
§ 371 (c)(1),
(2) Date: Sep. 2, 2015

(87) PCT Pub. No.: WO2014/148465
PCT Pub. Date: Sep. 25, 2014

(65) Prior Publication Data
US 2016/0017538 A1 Jan. 21, 2016

(30) Foreign Application Priority Data
Mar. 19, 2013 (JP) .................. 2013-057091

(51) Int. Cl.
*D06P 3/00* (2006.01)
*D06P 1/52* (2006.01)
*D06P 5/22* (2006.01)
*D06P 1/44* (2006.01)
*C08F 126/02* (2006.01)
*D06M 11/46* (2006.01)
*D06M 11/74* (2006.01)
*D06M 15/285* (2006.01)
*D06M 15/356* (2006.01)

(52) U.S. Cl.
CPC .......... *D06P 1/5242* (2013.01); *C08F 126/02* (2013.01); *D06M 11/46* (2013.01); *D06M 11/74* (2013.01); *D06M 15/285* (2013.01); *D06M 15/3562* (2013.01); *D06P 1/44* (2013.01); *D06P 5/22* (2013.01); *D06P 5/225* (2013.01)

(58) Field of Classification Search
CPC .... D06P 5/22; D06P 5/225; D06P 1/44; D06P 1/5242; D06M 15/3562; D06M 11/46; D06M 11/74; D06M 15/285; C08F 126/02
See application file for complete search history.

(56) References Cited

U.S. PATENT DOCUMENTS

| 5,006,129 A | 4/1991 | Martini et al. |
| 5,554,261 A | 9/1996 | Nilz et al. |
| 5,681,912 A * | 10/1997 | Kuo ............ C08F 226/02 526/263 |
| 6,039,768 A | 3/2000 | Ouziel |
| 2007/0004849 A1 | 1/2007 | Siemensmeyer et al. |
| 2007/0107864 A1 | 5/2007 | Hahnle et al. |
| 2016/0047087 A1 | 2/2016 | Crepet et al. |

FOREIGN PATENT DOCUMENTS

| JP | 6-2288 A | 1/1994 |
| JP | 2751806 B2 | 5/1998 |
| JP | 10-259579 A | 9/1998 |
| JP | 2007-31847 A | 2/2007 |
| JP | 2007-507620 A | 3/2007 |
| JP | 2007-303020 A | 11/2007 |
| WO | WO 2014/167208 A1 | 10/2014 |

OTHER PUBLICATIONS

STIC Search REport dated Mar. 21, 2017.*
Extended European Search Report dated Mar. 8, 2016 in European Application No. 14769121.6.
Office Action dated Nov. 24, 2016 in Korean Patent Application No. 10-2015-7025413.
International Search Report dated Jun. 3, 2014 in PCT/JP14/057267 Filed Mar. 18, 2014.

* cited by examiner

*Primary Examiner* — Eisa Elhilo
(74) *Attorney, Agent, or Firm* — Oblon, McClelland, Maier & Neustadt, L.L.P.

(57) ABSTRACT

A cationizing agent for cationizing a cloth prior to the firm fixing of water-insoluble particles onto the cloth, said cationizing agent comprising a polymer having a constituent unit (a1) derived from a vinylamine monomer represented by formula (1). (In the formula, $R^1$ represents a hydrogen atom or a methyl group.)

7 Claims, No Drawings

CATIONIZING AGENT, METHOD FOR FIRMLY FIXING WATER-INSOLUBLE PARTICLES, AND METHOD FOR PRODUCING DYED MATERIAL

TECHNICAL FIELD

The present invention relates to a cationizing agent, a method for firmly fixing water-insoluble particles, and a method for producing a dyed material.

This application is based on and claims the benefit of priority from Japanese Patent Application No. 2013-057091, filed on 19 Mar. 2013, the content of which is incorporated herein by reference.

BACKGROUND ART

For fibers and fabric, processing such as dyeing by firming fixing staining pigments, dyes, etc. is often conducted. However, the dyeing of fibers and fabrics by dyes generally has a low solid fastness, but the dyeing is easy. In addition, for dyeing by pigments, there are advantages such as the pigments hardly fading, and the characteristic texture such as for casual wear being obtained; however, from the pigments being insoluble in water, it hardly penetrates into the fibers, and mostly adheres to the surface; therefore, it is difficult to firmly attach in a great amount. For this reason, there are problems such as deep-color processing being difficult and the washing fastness worsening. In particular, for suede-like fabric from superfine fibers, fabrics consisting of aramid fibers, etc., dyeing is difficult.

As a method of improving the washing fastness by firmly fixing pigments, etc. efficiently, it has been known to use various binders. However, it does not necessarily mean that a sufficient effect will be obtained, and when using binders in abundance, there are side effects such as inhibiting the flexibility of the fibers.

On the other hand, fiber processing has been known that uses the hydrolysate of polyvinylamines, which are cationic water-soluble macromolecules, particularly N-vinylamide polymer.

For example, Patent Document 1 discloses a polymer having constituent units derived from vinylamine monomer as a dye-fixing agent used in cellulose-based fibers dyed by reactive dyes. However, with the fiber processing of Patent Document 1, it is difficult to efficiently firmly fix water-insoluble particles such as pigments.

Patent Document 1: Japanese Unexamined Patent Application, Publication No. H06-2288

DISCLOSURE OF THE INVENTION

Problems to be Solved by the Invention

The present invention provides a cationizing agent that can firmly fix water-insoluble particles such as pigment to fabric efficiently, a method for firmly fixing water-insoluble particles using this cationizing agent, and a method for producing a dyed material.

Means for Solving the Problems

As a result of thorough investigation to solve the above-mentioned issues, the present inventors found that water-insoluble particles such as pigments could be firmly fixed to fabric efficiently when using a polymer having constituent units derived from vinylamine monomer as a cationizing agent, thereby arriving at the present invention. More specifically, the present invention is as follows.

According to a first aspect of the present invention, a cationizing agent for cationizing a fabric prior to firmly fixing water-insoluble particles to the fabric, the cationizing agent comprising:

a polymer having a constituent unit (a1) derived from a vinylamine monomer represented by formula (1) below,

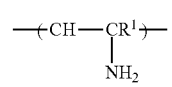

wherein $R^1$ represents a hydrogen atom or a methyl group.

According to a second aspect of the present invention, in the cationizing agent as described in the first aspect, the constituent unit (a1) derived from a vinylamine monomer is a hydrolysate of a polymer having a constituent unit derived from an N-vinylamide compound, the cationizing agent further comprises a constituent unit (a2) derived from an N-vinylamide compound represented by formula (2) below, wherein relative to total constituent units of the polymer, a ratio of the constituent unit (a1) is 5 to 99.9 mol %, and a ratio of the constituent unit (a2) is 95 to 0.1 mol %,

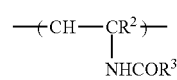

wherein $R^2$ represents a hydrogen atom or a methyl group, and $R^3$ represents a C1-C6 alkyl group.

According to a third aspect of the present invention, a method for firmly fixing water-insoluble particles, comprising:

a cationizing step of cationizing a fabric by firmly fixing the cationizing agent as described in the first or second aspect to a fabric; and a fixing step of firmly fixing water-insoluble particles to the fabric by bringing the water-insoluble particles into contact with the fabric after the cationizing step.

According to a fourth aspect of the present invention, the method for firmly fixing water-insoluble particles as described in the third aspect, wherein the fabric is a fabric formed from at least one type of fiber selected from the group consisting of cotton, acrylic fiber, polyester fiber, acetate fiber and aramid fiber.

According to a fifth aspect of the present invention, the method for firmly fixing water-insoluble particles as described in the third or fourth aspect, wherein the fabric is a suede-like fabric consisting of ultrafine fibers.

According to a sixth aspect of the present invention, the method for firmly fixing water-insoluble particles as described in any one of the third to fifth aspects, wherein the fabric has a zeta potential of −100 to −1 mV.

According to a seventh aspect of the present invention, a method for producing a dyed material comprising: a cationizing step of cationizing a fabric by firmly fixing the cationizing agent as described in the first or second aspect to the fabric; and a dying step of firmly fixing a pigment to the fabric to dye the fabric, by bringing the pigment into contact with the fabric after the cationizing step.

According to an eighth aspect of the present invention, the method for producing as described in the seventh aspect, wherein the pigment is at least one type selected from the group consisting of azo-based pigment, phthalocyanin-based pigment, anthraquinone-based pigment, quinacridone-based pigment, perylene-based pigment, perinone-based pigment, dioxazine-based pigment, quinophthalone-based pigment, fluorescent pigment, carbon and titanium oxide.

Effects of the Invention

When using the cationizing agent of the present invention, it is possible to firmly fix water-insoluble particles such as pigments to fabric efficiently.

According to the method for firmly fixing water-insoluble particles of the present invention, it is possible to firmly fix water-insoluble particles such as pigments to fabric efficiently.

According to the method for producing a dyed material of the present invention, a dyed material made by firmly fixing pigment to a fabric efficiently is obtained.

PREFERRED MODE FOR CARRYING OUT THE INVENTION

<Cationizing Agent>

The cationizing agent of the present invention is a cationizing agent used in order to cationize a fabric prior to firmly fixing water-insoluble particles to the fabric. The cationizing agent of the present invention consists of a polymer (hereinafter referred to as "polymer (A)") having constituent units (hereinafter referred to as "unit (a1)") derived from vinylamine monomer. "Constituent unit derived from vinylamine monomer" indicates the repeating unit constituting the polymer structure formed by polymerization of vinylamine monomer, and the structure thereof is a molecular structure in which two carbons of an ethylene group derived from the vinyl group in the vinylamine monomer form a bonding site; however, so long as the structure is the same as this, it is not limited to having vinylamine monomer as the raw material. In addition, the naming of other constituent units will follow the above description.

The units (a1) of the polymer (A) are preferably constituent units derived from N-vinylamine monomer, and more specifically, are preferably constituent units having a structure represented by formula (1) below.

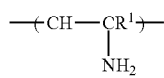

(1)

(In the formula, $R^1$ represents hydrogen or a methyl group.)

The polymer (A) having the units (a1), for example, can be obtained by exchanging at least one side chain of the constituent units thereof with an amino group by subjecting the vinylamide polymer (hereinafter "polymer (A) precursor") to a denaturing process such as hydrolysis or the Hoffmann reaction. More specifically, the constituent units (a1), for example, can be formed with a polymer having constituent units derived from an N-vinylamide compound (hereinafter referred to as "N-vinylamide polymer") as a polymer (A) precursor by hydrolyzing this; or by converting at least a part of the side chains of the constituent units of the polymer (A) precursor to amino groups with a polymer having constituent units derived from an acrylamide compound as the polymer (A) precursor and subjecting this to the Hoffman reaction.

The polymer (A) is preferably a hydrolysate of N-vinylamide polymer. In other words, the units (a1) are preferably formed with the N-vinylamide polymer as the polymer (A) precursor by hydrolyzing this.

As the N-vinylamide compound, for example, N-vinylcarboxylic acid amide, i.e. compounds represented by formula (i) below, etc. can be exemplified.

However, in formula (i), R represents a hydrogen atom or a C1-C6 alkyl group.

As compounds represented by formula (i), for example, N-vinylformamide, N-vinylacetamide, N-vinylpropionamide, N-vinylbutyramide, etc. can be exemplified.

In the case of using a compound represented by the formula (i) as the raw material monomer, the —NHCOR group as the polymer side chain is converted to an unsubstituted or substituted amino group (—NH$_2$) by polymerizing this, and then subjecting to the hydrolysis treatment described later, whereby it is possible to form the unit (a1).

As the acrylamide compound, for example, a (meth)acrylamide, N-alkyl(meth)acrylamide (alkyl group having 1 to 6 carbons), N,N-dialkyl(meth)acrylamide (alkyl group having 1 to 6 carbons), dialkylaminoethyl(meth)acrylamide (alkyl group having 1 to 6 carbons) and salts or quaternary compounds thereof, dialkylaminopropyl(meth)acrylamide (alkyl group having 1 to 6 carbons) and salts or quaternary compounds thereof; diacetone acrylamide; etc. can be exemplified.

In the case of using the acrylamide compound as the raw material monomer, the unit (a1) can be formed by polymerizing this, then subjecting to the Hoffman reaction described later, whereby the unsubstituted or substituted carbamoyl group (—CONH$_2$) of the polymer side chain is converted to an unsubstituted or substituted amino group (—NH$_2$).

N-vinylformamide is preferable as the monomer used in the formation of the unit (a1) from the point of formation of unit (a1) being easy.

The polymer (A) may have a constituent unit (hereinafter referred to as "co-monomer unit") derived from another monomer other than a vinylamine monomer, in addition to the unit (a1), as necessary.

As the other monomer, it is possible to use any monomer having an ethylenic unsaturated bond and, for example, (meth)acrylic acid and salts thereof, (meth)acrylic ester (ester of (meth)acrylic acid and C1-C6 alcohol or phenol), (meth)acrylonitrile, N-vinylpyrrolidone, N-vinylcaprolactam, vinyl acetate, etc. can be exemplified. In addition, in the case of forming the unit (a1) of the polymer (A) by way of the hydrolysis of N-vinylamide polymer, the acrylamide compound may be used as the other monomer. However, in this case, denaturing will not occur by the Hoffman reaction after polymerization. In addition, in the case of forming the unit (a1) of the polymer (A) by way of the Hoffman reaction of acrylamide polymer, the N-vinylamide compound may be used as the other monomer. However, in this case, denaturing will not occur by the Hoffman reaction after polymerization.

In addition, the co-monomer unit may be a constituent unit (a2) derived from residual N-vinylamide compound that did not hydrolyze in the hydrolysis of the N-vinylamide polymer (polymer (A) precursor). The unit (a2) has a structure represented by formula (2) below.

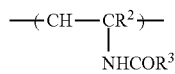 (2)

(In the formula, $R^2$ represents a hydrogen atom or methyl group, and $R^3$ represents a C1-C6 alkyl group.)

In addition, the co-monomer unit may be a constituent unit derived from residual acrylamide compound that is unreacted in the Hoffman reaction of the acrylamide compound (polymer (A) precursor).

The proportion of the unit (a1) relative to the total constituent units (100 mol %) of the polymer (A) is preferably 5 to 99.9 mol %. The proportion of the unit (a1) is preferably at least 40 mol %, more preferably at least 70 mol %, and particularly preferably at least 95 mol %. Furthermore, it is preferably less than 100 mol %. If the proportion of the unit (a1) is at least the lower limit value and less than the upper limit value, the firmly fixing efficiency of the water-insoluble particles will become more favorable. In addition, the proportion of the unit (a2) relative to the total constituent units (100 mol %) of the polymer (A) is preferably 95 to 0.1 mol %.

In the case of obtaining the polymer (A) from the hydrolysate of N-vinylamide polymer (polymer (A) precursor), the lower limit value for the proportion of constituent units derived from the N-vinylamide compound among the total constituent units (100 mol %) of the polymer (A) precursor is preferably 5 mol %, more preferably 10 mol %, even more preferably 50 mol %, and particularly preferably 70 mol %. If the proportion of constituent units derived from the N-vinylamide compound is at least the lower limit value, the proportion of the unit (a1) formed by hydrolysis will increase, and the firmly fixing efficiency of the water-insoluble particles will become more favorable.

The polymerization method for obtaining the polymer (A) precursor is not particularly limited, and a known method can be employed such as aqueous polymerization, aqueous solution standing adiabatic polymerization, suspension polymerization, emulsion polymerization and photo-belt continuous polymerization.

It is possible to use a radical polymerization initiator in polymerization. As the radical polymerization initiator, a redox initiator, azo initiator, peroxide, etc. can be exemplified. Only one type of radical polymerization initiator may be used, or two or more types may be jointly used. In addition, the radical polymerization initiator may be water soluble, or may be oil soluble. In the case of using an oil-soluble radical polymerization initiator, it is added by dissolving in a water-miscible solvent.

As the water-soluble azo initiator, 2,2'-azobis(2-amidinopropane)dihydrochloride, 2,2'-azobis[2-(5-methyl-2-imidazolin-2-yl)propane]dihydrochloride, 4,4'-azobis(4-cyanovaleric acid), etc. can be exemplified.

As the oil-soluble azo initiator, for example, 2,2'-azobisisobutyronitrile, 1,1'-azobis(cyclohexanecarbonitrile), 2,2'-azobis(2-methyl butyronitrile), 2,2'-azobis(2-methyl propionate), 2,2'-azobis(4-methoxy-2,4-dimethyl)valeronitrile, etc. can be exemplified.

As the redox initiator, combinations of ammonium peroxodisulfate with sodium sulfite, sodium hydrogen sulfite, trimethylamine, tetramethyl ethylenediamine, etc.; combinations of t-butyl hydroperoxide with sodium sulfite, sodium hydrogen sulfite; etc. can be exemplified.

As the peroxide, for example, ammonium or potassium peroxodisulfate, hydrogen peroxide, benzoyl peroxide, lauryl peroxide, octanoyl peroxide, succinic peroxide, t-butyl peroxy-2-ethyl hexanoate, etc. can be exemplified.

In polymerization, it is preferable to jointly use a redox initiator whereby polymerization initiates at low temperature, and a water-soluble azo initiator whereby polymerization initiates at relatively high temperature. In this case, it is preferable to jointly use a combination of t-butyl hydroperoxide with sodium sulfite or sodium hydrogen sulfite as the redox initiator, and 2,2'-azobis(2-amidinopropane)dihydrochloride as the water-soluble azo initiator. Polymerization will thereby tend to easily complete, even if the polymerization temperature greatly differs between the polymerization initiation time and end time.

In the case of photopolymerization, a well-known photopolymerization initiator can be used.

In the case of using an azo-based initiator, the amount used of initiator is preferably 100 to 10,000 ppm by mass, and more preferably 500 to 5,000 ppm by mass, relative to the total mass of monomer used.

In the case of using a redox-based initiator, the amount used of initiator is preferably 10 to 1,000 ppm by mass, and more preferably 30 to 600 ppm by mass, relative to the total mass of monomer used.

So long as the amount used of initiator is at least the lower limit value, sufficient polymerization rate will tend to be obtained. So long as the amount used of initiator is no more than the upper limit value, the molecular weight of the polymer will tend to be suppressed from becoming too low.

In the case of producing the polymer (A) by way of hydrolysis of a polymer (A) precursor having constituent units derived from an N-vinylamide compound, in regards to the molecular weight of the polymer (A) precursor, with the index of the value of reduced viscosity ($\theta_{sp}/C$) at 25° C. of an aqueous solution dissolving the polymer (A) precursor so that the concentration is 0.1 g/dL, it is preferably 0.05 to 12, and more preferably 0.1 to 11.

The viscosity-average molecular weight of the polymer (A) precursor having constituent units derived from an N-vinylamide compound is preferably 5,000 to 5,000,000, and more preferably 10,000 to 4,000,000. The viscosity average molecular weight can be measured by the method described in the Examples.

Hydrolysis of the polymer (A) precursor may be performed using an acid, or may be performed using a base. In the case of using an acid, a strong acid such as hydrochloric acid is used, and in the case of using a base, a strong base such as sodium hydroxide is used.

The amount used of acid or base differs depending on the hydrolysis rate desired; however, it is normally 0.8 to 2 equivalents, and preferably 1 to 1.5 equivalents, relative to the constituent units derived from vinylamine monomer in the polymer (A) that is the target. Depending on the type of raw material monomer, in the case of a substance that more easily hydrolyzes than the N-vinylcarboxylic acid amide group coexisting in the hydrolysis reaction system, it is necessary to excessively use in an amount counterbalancing this as a matter of course. In addition, the acid or base is preferably dissolved in advance and supplied to the hydrolysis reaction as a solution. In this case, a higher concentration of the solution is more preferable in reaction operation. In the method of the present invention, the hydrolysis reaction is carried out by mixing the acid or base with the polymer (A) precursor of powder form on which insolubizing treatment has been performed, so as to bring into direct contact. The mixing method is not particularly limited, and a method similar to the mixing method in the insolubization prevention treatment is appropriately used. More specifically, a method of placing in a bag and shaking to mix, a method of mixing in a batch operation using a blender such as a mixer of rotating container type in which a cylinder, dual cone, Y-type or the like container rotates, a ribbon mixer, a screw mixer, or a mixer of blade rotation-type such as disk rotation type; a method of mixing while adding the acid or base in the middle of transferring using a screw conveyor, and continuously feeding; etc. are exemplified. In particular, a system that disperses the acid or base in the polymer (A) precursor of powder form that is in a solid-phase state while flowing or moving is preferable.

The hydrolysis is carried out normally at 20 to 90° C. The reaction time differs depending on temperature; however, it is normally from 1 minute to 1 week. There is no requirement for agitation of reactants to continue during reaction, and so long as the acid or base is absorbed into the polymer of powder form, it may be left to stand as is afterwards. The time for which it can be left to stand is no longer than 24 hours. Acid or alkali may remain depending on the conditions of hydrolysis.

After carrying out hydrolysis, neutralizing may be carried out, or it may be left as is.

The polymer (A) serving as the cationizing agent of the present invention is normally used in the form of a solution (chemical solution) such as an aqueous solution. In addition, the concentration of the polymer (A) in solution is preferably 0.01 to 1% by mass, and more preferably 0.1 to 0.5% by mass.

By cationization treating a fabric by way of the cationizing agent of the present invention explained above, prior to firmly fixing water-insoluble particles, it is possible to firmly fix water-insoluble particles to the fabric efficiently. The product of firmly fixing water-insoluble particles after treating with the cationizing agent of the present invention has high dyeing affinity, and thus the function accord to the water-insoluble particles tends to be sufficiently exhibited, even after washing.

<Method for Firmly Fixing Water-Insoluble Particles>

The method for firmly fixing water-insoluble particles of the present invention is a method for firmly fixing water-insoluble particles to fabric using the cationizing agent of the present invention. The method for firmly fixing water-insoluble particles of the present invention includes the cationizing step and fixing step described later.

(Cationizing Step)

In the cationizing step, the fabric is treated by the cationizing agent of the present invention.

As a specific method of cationization treatment, for example, a method of immersing the water-rinsed fabric in an aqueous solution containing the cationizing agent of the present invention (chemical solution), and water rinsing after having absorbed the cationizing agent can be exemplified. After absorbing the cationizing agent, the cationizing agent of a surplus amount is removed by performing an operation such as water rinsing and dehydration.

The cationization treatment may be carried out by way of a continuous treatment, or may be carried out by way of a batch treatment.

If the adhered amount of cationizing agent is at least the lower limit value, the firmly fixing efficiency of the water-insoluble particles will tend to rise. In addition, if the adhered amount of cationizing agent is no more than the upper limit amount, it is advantageous also economically since the defects such as discoloration of the fabric will hardly occur.

The content of cationizing agent in the chemical solution is preferably 0.5 to 15% by mass, and more preferably 1 to 10% by mass, relative to the total mass of the chemical solution. If the content of the cationizing agent is at least the lower limit value, the firmly fixing efficiency of the water-insoluble particles will tend to rise. In addition, if the content of the cationizing agent is no more than the upper limit value, it is advantageous also economically since the defects such as discoloration of the fabric will hardly occur.

The temperature in the cationization treatment is preferably 10 to 90° C., and more preferably 20 to 85° C.

The immersion time of the fabric is preferably 1 to 60 minutes.

The method of water rinsing is not particularly limited; however, it is preferably performed with a water flow of 0.1 to 10 L/min for 1 to 60 minutes. As one example of a representative water-rinsing method, washing for 10 minutes with a water flow of 3.6 L/min can be exemplified.

Although the dehydrating method is not particularly limited, it is possible to using a centrifugal dehydrating method, and preferably is performed for 10 seconds to 10 minutes at 1,000 to 10,000 rpm. As one example of a representative dehydrating method, dehydrating with a centrifugal dehydrator at 3,000 rpm for 1 minute can be exemplified.

The type of fibers constituting the fabric is not particularly limited, and natural fibers such as cotton, hemp, wool and silk, regenerated fibers such as rayon, cupra and polynosic; half-regenerated fibers such as acetate; synthetic fibers such as nylon, polyester and acrylic; fibers containing poval, etc.; aramid fibers (aromatic polyamide fiber); and the like can be exemplified. Thereamong, cotton, acrylic fiber, polyester fiber, acetate fiber and aramid fiber are preferable. In addition, it is possible to use two or more types of fibers among the fibers given above by mixed spinning.

The method for firmly fixing of the present invention makes possible the efficient firm fixing of water-insoluble particles to fabric formed from at least one type of fiber selected from the group consisting of cotton, acrylic fiber, polyester fiber, acetate fiber and aramid fiber, which had been difficult by conventional methods. In addition, the method for firmly fixing of the present invention is preferably applied to suede-like fabric consisting of ultrafine fibers. As an example of this suede-like fabric, a suede-like fabric having suede-like naps consisting of ultrafine fibers of no more than 1 dtex at the surface can be exemplified. As the raw material of the ultrafine fabric, polyester, polyamide and combinations thereof, etc. can be exemplified. In regards to the substrate portion other than the nap part, it is as described for the fabric. In addition, the zeta potential (electrokinetic potential) of the fabric is preferably −100 to −1 mV. In particular, it is preferably −50 to −1 mV. The zeta potential referred to herein is a value measured when the water immersing the fabric sought to be measured has a conductivity at 20° C. in the range of 100 µS/cm to 7 mS/cm. Although the reason for the cationizing agent of the present invention exhibiting high effectiveness is not definite, it is considered to be because of having an ability to make efficient bonds with fabric having low zeta potential.

(Fixing Step)

In the fixing step, the water-insoluble particles are firmly fixed to the fabric after the cationizing step.

As the specific method of the fixing process, for example, a method of immersing the fabric subjected to the cationizing step into a dispersion made by dispersing the water-insoluble particles to firmly fix these water-insoluble particles, and then rinsing with water can be exemplified.

The fixing process may be carried out by a continuous process, or may be carried out by a batch process.

Water-insoluble particles are generally particles having a particle size of 1 nm to 30 μm, and are particles that suspend in water as particulates. As the water-insoluble particles, pigments are representative, and well-known organic pigments and inorganic pigments can be used as the pigments. As organic pigments, for example, it is possible to use at least one type selected from the group consisting of azo-based pigments, phthalocyanine-based pigments, anthraquinone-based pigments, quinacridone-based pigments, perylene-based pigments, perinone-based pigments, dioxazine-based pigments, quinophthalone-based pigments and fluorescent pigments, and as the inorganic pigment, for example, it is possible to use at least one type selected from the group consisting of carbon and titanium oxide. In addition, it is possible to use at least one type of the organic pigments and at least one type of the inorganic pigments by combining.

The azo-based pigment referred to herein is a compound having an azo group, and specifically, Pigment Yellow 14, Pigment Red 57, etc. can be exemplified thereas.

The phthalocyanine-based pigment referred to herein is a cyclic compound having a structure in which four phthalic imides are cross-linked by nitrogen atoms, and specifically, Pigment Blue 16, Pigment Green 7, etc. can be exemplified there as.

The anthraquinone-based pigment referred to herein is an organic pigment derived from anthraquinone, and specifically, Pigment Red 168, Pigment Red 177, etc. can be exemplified there as.

The quinacridone-based pigment referred to herein is a heterocyclic pigment having high symmetry, and specifically, Pigment Violet 19, Pigment Red 122, etc. can be exemplified thereas.

The perylene-based pigment referred to herein is a pigment having a structure established by losing two oxygen atoms constituting a six-membered ring of perylene tetracarboxylic acid dianhydride, and specifically, Pigment Red 149, Pigment Red 179, etc. can be exemplified thereas.

The perinone-based pigment referred to herein is a perinon that is a ring-condensed compound, and specifically, Pigment Orange 43, etc. can be exemplified thereas.

The dioxazine-based pigment referred to herein is a pigment having two oxazine rings per molecule, and specifically, Pigment Violet 23, Pigment Violet 37, etc. can be exemplified thereas.

The quinophthalone-based pigment referred to herein is a pigment obtained from quinaldine and phthalic anhydride, and specifically, Pigment Yellow 138, Pigment Yellow 177, etc. can be exemplified thereas.

The fluorescent pigment referred to herein is an organic pigment consisting of a rhodamine derivative and an inorganic pigment consisting of rare earth elements.

Carbon referred to herein is a particulate of carbon element with a diameter of 3 to 500 nm, and specifically, Pigment Black 7, etc. can exemplified thereas.

The titanium oxide referred to herein is a particulate of mainly titanium dioxide, and specifically, Pigment White 6, Pigment Yellow 7, etc. can be exemplified thereas.

In the case of using pigment as the water-insoluble particles, the content of pigment in the dispersion (100% by mass) is preferably 0.1 to 50% by mass, and more preferably 1 to 30% by mass. If the content of pigment is at least the lower limit value, the efficiency of dyeing will be more favorable. If the content of pigment is no more than the upper limit value, color spotting will hardly appear, and the pigment will tend to disperse in water uniformly.

The temperature of the dispersion upon the fixing process is preferably 40 to 90° C., and more preferably 50 to 80° C.

The immersion time of the fabric is preferably between 10 and 30 minutes.

After the fixing process, a well-known fastness improving treatment by way of a fixing agent such as a binder may be carried out. As examples of the binder, polyurethane, polyester and polyacrylic acid ester can be exemplified.

In the method for firmly fixing water-insoluble particles of the present invention explained above, the fixing step is performed after performing the cationizing step by way of the cationizing agent of the present invention; therefore, it is possible to firmly fix water-insoluble particles to fabric efficiently. The fabric obtained in the method for firmly fixing water-insoluble particles of the present invention has high washing fastness, and thus it is possible to sufficiently exhibit the functions according to the water-insoluble particles, even after washing.

Although the reason for the polymer (A) exhibiting high effectiveness is not definite, it is considered to be because of having a high functional group density as a cationic polymer, and having an ability of the primary amine to form diverse bonds such as covalent bonds and coordinate bonds with heat, in addition to ionic bonds and hydrogen bonds. Furthermore, in the case of the unit (a1) being derived from N-vinylcarboxylic acid amide, it is considered that the residual carboxylic acid amide groups also contribute to the firm fixing of water-insoluble particles by way of the formation of hydrogen bonds, etc.

The water-insoluble particles referred to herein are particles made by dispersing no more than 1 g in 100 g of water at 25° C., and cannot be made to directly penetrate into the fabric as an aqueous solution as in dyes, and thus conventionally it had not been possible to make by itself a sufficient amount for the objective of coloring to adhere to a fabric surface, and it has been made possible to firmly fix this in a practical amount to a fabric surface to dye for the first time by way of the cationizing agent according to the present invention.

<Method for Producing Dyed Material>

The method for producing a dyed material of the present invention is a method that obtains a dyed material by staining a fabric using pigments as the water-insoluble particles.

According to the method for producing a dyed material of the present invention, since the fixing step is performed after performing the cationizing step by way of the cationizing agent of the present invention, it is possible to dye fabric more efficiently. As the pigment and fabric, it is possible to use those described in connection with the method for firmly fixing of the present invention.

In addition, as a specific method for producing a dyed material, it is possible to perform by a method having the cationizing step and the fixing step.

EXAMPLES

Hereinafter, the present invention will be explained in detail by way of Examples; however, the present invention is not to be limited to the following descriptions.

[Molecular Weight]

The viscosity-average molecular weight of the polymer was calculated by measuring the reduced viscosity (25° C.) of the product of dissolving the polymer in 1N brine so that the concentration became 1 g/dL, deriving intrinsic viscosity according to Huggins formula (reduced viscosity=η+0.31× η²×C; provided that C is a concentration of 0.1 g/dl, and η is intrinsic viscosity), according to the limiting viscosity equation $[\eta]=8.31\times10^{-5}\times M^{0.76}$ (M is viscosity-average molecular weight).

Synthesis Example 1

An N-vinylformamide polymer (polymer (A) precursor) aqueous solution having a polymer concentration of 30% by mass was obtained by heating 700 ml of degassed desalted water to 70° C., adding 3 g of azobis amidinopropane hydrochloride, adding dropwise N-vinylformamide (300 g) over 3 hours under a nitrogen flow, followed by adding 1.5 g of azobis amidinopropane hydrochloride and further curing for 3 hours.

The molecular weight of the N-vinylformamide polymer (polymer (A) precursor) was 100,000. After confirming that there was no residual monomer, hydrolysis reaction was performed for 3 hours at 80° C. using 1.4 times the moles of sodium hydroxide relative to the amount used of N-vinylformamide, thereby obtaining a polymer aqueous solution-1 having a polymer concentration of 12% by mass, containing polymer (A1) having a ratio of units (a1) relative to overall constituent units of 95 mol %.

Synthesis Example 2

After obtaining an N-vinylformamide polymer (polymer (A) precursor) aqueous solution similarly to Synthesis Example 1, the amount used of sodium hydroxide was changed to 0.7 times the moles of the amount used of N-vinylformamide and hydrolysis was performed similarly to Synthesis Example 1, and after hydrolysis, 35% hydrochloric acid was partially neutralized with half the amount of sodium hydroxide used in hydrolysis, thereby obtaining polymer aqueous solution-2 having a polymer concentration of 21% by mass, containing polymer (A2) with a ratio of units (a1) relative to the overall constituent units of 70 mol %.

Synthesis Example 3

N-vinylformamide was dissolved in degassed desalted water so as to be 30% by mass, then cooled to 0° C., 300 ppm by mass of t-butyl hydroperoxide, 300 ppm by mass of sodium bisulfate and 1,000 ppm by mass of azobis amidinopropane hydrochloride were added thereto, and polymerization was carried out. After 6 hours, a gel-like aqueous solution containing 30% by mass of N-vinylformamide with a molecular weight of 2,000,000 was obtained. The obtained gel was partially collected and pulverized, then diluted with water to make an aqueous solution containing 5% by mass of the gel. Furthermore, a 48% sodium hydroxide aqueous solution was added at 0.4 times the moles relative to the N-vinylformamide, and the hydrolysis reaction was carried out for 4 hours at 70° C. Subsequently, 35% hydrochloric acid was partially neutralized with half the amount of sodium hydroxide used in hydrolysis, thereby obtaining polymer aqueous solution-3 having a polymer concentration of 4% by mass, containing polymer (A3) having a ratio of units (a1) (units of hydrochloride salt) relative to the overall constituent units of 40 mol %.

The zeta potential of the fabric was measured with a Fiber Potential Analyzer Model FPA manufactured by Nihon Rufuto Co., Ltd.

Example 1

As the fabric, Indian woven, unbleached cotton cloth was used. The fabric (cloth zeta potential: −15.7 mV) was rinsed with hot water at 80° C. for 5 minutes, then centrifugally dehydrated for 1 minute at 3,000 rpm. Subsequently, it was allowed to dry for 12 hours at 25° C.

Using the polymer aqueous solution-1 obtained in Synthesis Example 1, a chemical solution was prepared by dissolving 5% by mass of polymer (A1) pure content relative to the cloth mass in 30 times the water by volume ratio relative to the cloth amount. The temperature of the chemical solution was set to 60+/−2° C., the dehydrated cloth was placed therein, and immersion treated for 20 minutes. The treated cloth was washed with water for 10 minutes, and subsequently centrifugal dehydrated for 1 minute at 3,000 rpm.

Next, 5% by mass of pigment (organic pigment Navy Blue FL2R conc, manufactured by Dainichiseika Colour & Chemicals Mfg. Co., Ltd.) relative to the cloth mass was dispersed in 30 times the water by volume ratio relative to the cloth. The temperature of the obtained dispersion was set to 60+/−2° C., and the cloth was immersed for 20 minutes to uptake the pigment. Subsequently, it was rinsed with water for 10 minutes, centrifugal dehydrated for 1 minute at 3,000 rpm, followed by performing drying at 25° C. for 12 hours.

Examples 2 and 3

Pigment was firmly fixed in a similar way to Example 1, except for using the polymer aqueous solution-2 (Example 2) or polymer aqueous solution-3 (Example 3) in place of the polymer aqueous solution-1.

Comparative Example 1

Pigment was firmly fixed in a similar way to Example 1, except for using an aqueous solution containing 8% by mass of Effector-DS2C (dimethylaminoethyl methacrylate methylchloride quaternary salt homopolymer, manufactured by Dainichiseika Colour & Chemicals Mfg. Co., Ltd.) as the cationizing agent in place of the polymer aqueous solution-1.

[Evaluation of Dyeing Affinity]

The dyeing affinity was judged visually in the following way.
⊚: particularly deeply dyed
○: dyed with sufficient deepness
Δ: weakly dyed
x: almost undyed The evaluation results of Examples 1 to 3 and Comparative Example 1 are shown in Table 1.

TABLE 1

|  | Cationizing agent | Dyeing affinity |
| --- | --- | --- |
| Example 1 | Polymer (A1) | ⊚ |
| Example 2 | Polymer (A2) | ○ |
| Example 3 | Polymer (A3) | ○ |
| Comparative Example 1 | Effector-DS2C | Δ |

Examples 4 to 6 and Comparative Example 2

Pigment was firmly fixed in a similar way to Examples 1 to 3 and Comparative Example 1, except for using an organic pigment, BlackFLTR conc, manufactured by Dainichiseika Colour & Chemicals Mfg. Co., Ltd., as the pigment.

The evaluation results of Examples 4 to 6 and Comparative Example 2 are shown in Table 2.

TABLE 2

|  | Cationizing agent | Dyeing affinity |
| --- | --- | --- |
| Example 4 | Polymer (A1) | ⊚ |
| Example 5 | Polymer (A2) | ○ |
| Example 6 | Polymer (A3) | ○ |
| Comparative Example 2 | Effector-DS2C | Δ |

Example 7 and Comparative Example 3

Pigment was firmly fixed in a similar way to Example 1 and Comparative Example 1, except for using an organic pigment, R-850 (titanium oxide), manufactured by Dainichiseika Colour & Chemicals Mfg. Co., Ltd., as the pigment.

The evaluation results of Example 7 and Comparative Example 3 are shown in Table 3.

TABLE 3

|  | Cationizing agent | Dyeing affinity |
| --- | --- | --- |
| Example 7 | Polymer (A1) | ⊚ |
| Comparative Example 3 | Effector-DS2C | Δ |

Examples 8 to 10 and Comparative Example 4

Pigment was firmly fixed in a similar way as Examples 1 to 3 and Comparative Example 1, except for using suede-like artificial leather (zeta potential of −45.1 mV) consisting of ultrafine fibers as the cloth, and using an organic pigment, TC Brown FD or Black FLTR conc, manufactured by Dainichiseika Colour & Chemicals Mfg. Co., Ltd., as the pigment.

The evaluations results of Examples 8 to 10 and Comparative Example 4 are shown in Table 4.

TABLE 4

|  | Cationizing agent | Dyeing affinity |
| --- | --- | --- |
| Example 8 | Polymer (A1) | ⊚ |
| Example 9 | Polymer (A2) | ○ |
| Example 10 | Polymer (A3) | Δ |
| Comparative Example 4 | Effector-DS2C | X |

Example 11 and Comparative Example 5

Pigment was firmly fixed in a similar way to Example 1 and Comparative Example 1, except for using polyester cloth (zeta potential of −20.8 mV) as the cloth, and using the organic pigment Black FLTR conc, manufactured by Dainichiseika Colour & Chemicals Mfg. Co., Ltd. as the pigment.

The evaluation results of Example 11 and Comparative Example 5 are shown in Table 5.

TABLE 5

|  | Cationizing agent | Dyeing affinity |
| --- | --- | --- |
| Example 11 | Polymer (A1) | ⊚ |
| Comparative Example 5 | Effector-DS2C | Δ |

Example 12 and Comparative Example 6

Pigment was firmly fixed in a similar way to Example 1 and Comparative Example 1, except for using acrylic fibers (zeta potential of −26.4 mV) as the cloth, and using the organic pigment Black FLTR conc, manufactured by Dainichiseika Colour & Chemicals Mfg. Co., Ltd. as the pigment.

The evaluation results of Example 12 and Comparative Example 6 are shown in Table 6.

TABLE 6

|  | Cationizing agent | Dyeing affinity |
| --- | --- | --- |
| Example 12 | Polymer (A1) | ⊚ |
| Comparative Example 6 | Effector-DS2C | Δ |

Example 13 and Comparative Example 7

Pigment was firmly fixed in a similar way to Example 1 and Comparative Example 1, except for using acetate fibers (zeta potential of −3.7 mV) as the cloth, and using the organic pigment Black FLTR conc, manufactured by Dainichiseika Colour & Chemicals Mfg. Co., Ltd. as the pigment.

The evaluation results of Example 13 and Comparative Example 7 are shown in Table 7.

TABLE 7

|  | Cationizing agent | Dyeing affinity |
| --- | --- | --- |
| Example 13 | Polymer (A1) | ⊚ |
| Comparative Example 7 | Effector-DS2C | ○ |

Example 14 and Comparative Example 8

Pigment was firmly fixed in a similar way to Example 1 and Comparative Example 1, except for using para-aramid fibers (zeta potential of −77.0 mV) as the cloth, and using the organic pigment Black FLTR conc, manufactured by Dainichiseika Colour & Chemicals Mfg. Co., Ltd. as the pigment.

The evaluation results of Example 14 and Comparative Example 8 are shown in Table 8.

TABLE 8

|  | Cationizing agent | Dyeing affinity |
| --- | --- | --- |
| Example 14 | Polymer (A1) | Δ |
| Comparative Example 8 | Effector-DS2C | X |

As shown in Tables 1 to 8, in any of the cases, the Examples using polymers (A1) to (A3) as the cationizing agent had higher dyeing affinity, and higher fixing efficiency of pigment compared to the Comparative Examples using a conventional cationizing agent.

In particular, for the suede-like artificial leather, polyester fiber cloth, acrylic fiber cloth and aramid fiber cloth having zeta potentials in the range of −50 to −1 mV, the fixing efficiency of pigment was high.

The invention claimed is:

1. A method for firmly fixing water-insoluble particles onto a fabric, comprising:
   cationizing the fabric by firmly fixing a cationizing agent to the fabric, wherein the cationizing agent comprises a polymer comprising a constituent unit (a1) derived from a vinylamine monomer represented by formula (1); and
   firmly fixing water-insoluble particles to the fabric by bringing the water-insoluble particles into contact with the fabric after the cationizing

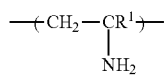
(1)

where $R^1$ represents a hydrogen atom or a methyl group.

2. The method according to claim 1, wherein the fabric is formed from at least one selected from the group consisting of a cotton, an acrylic fiber, a polyester fiber, an acetate fiber and an aramid fiber.

3. The method according to claim 1, wherein the fabric is a suede-like fabric comprising ultrafine fibers.

4. The method according to claim 1, wherein the fabric has a zeta potential of −100 mV to −1 mV.

5. A method for producing a dyed material, comprising:
   cationizing a fabric by firmly fixing a cationizing agent to the fabric, wherein the cationizing agent comprises a polymer comprising a constituent unit (a1) derived from a vinylamine monomer represented by formula (1); and
   firmly fixing a pigment to the fabric to dye the fabric, by bringing the pigment into contact with the fabric after the cationizing

(1)

where $R^1$ represents a hydrogen atom or a methyl group.

6. The method according to claim 5, wherein the pigment is at least one selected from the group consisting of an azo-based pigment, a phthalocyanin-based pigment, an anthraquinone-based pigment, a quinacridone-based pigment, a perylene-based pigment, a perinone-based pigment, a dioxazine-based pigment, a quinophthalone-based pigment, a fluorescent pigment, carbon and titanium oxide.

7. A fabric, comprising
   a cationizing agent comprising a polymer comprising a constituent unit (a1) derived from a vinylamine monomer represented by formula (1)

(1)

where $R^1$ represents a hydrogen atom or a methyl group; and
water-insoluble particles.

* * * * *